(12) United States Patent
Thomas et al.

(10) Patent No.: US 6,733,395 B2
(45) Date of Patent: May 11, 2004

(54) CONSTANT VELOCITY JOINT

(75) Inventors: Steven Mark Thomas, Saginaw, MI (US); William Paul Skvarla, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 87 days.

(21) Appl. No.: 10/104,387

(22) Filed: Mar. 22, 2002

(65) Prior Publication Data

US 2003/0181243 A1 Sep. 25, 2003

(51) Int. Cl.$^7$ .............................................. F16D 3/223
(52) U.S. Cl. ....................................... 464/143; 464/906
(58) Field of Search ................................ 464/141, 142, 464/143, 906

(56) References Cited

U.S. PATENT DOCUMENTS

| | | | |
|---|---|---|---|
| 1,985,278 A | | 12/1934 | Bradley |
| 2,010,899 A | | 8/1935 | Rzeppa |
| 2,579,356 A | * | 12/1951 | Anderson ............... 464/906 X |
| 3,107,504 A | * | 10/1963 | Koss ........................ 464/141 |
| 3,186,189 A | * | 6/1965 | Cull ....................... 464/906 X |
| 3,263,448 A | * | 8/1966 | Adams ................... 464/906 X |
| 4,459,122 A | * | 7/1984 | Rehfeld ...................... 464/143 |
| 4,511,345 A | * | 4/1985 | Winkler ................. 464/143 X |
| 4,941,862 A | * | 7/1990 | Hazebrook et al. ......... 464/141 |
| 4,950,206 A | | 8/1990 | Jacob |
| 5,201,107 A | | 4/1993 | Mazziotti |
| 5,230,659 A | | 7/1993 | Bird et al. |
| 6,159,103 A | | 12/2000 | Lu |
| 6,186,899 B1 | | 2/2001 | Thomas et al. |
| 6,190,260 B1 | | 2/2001 | Flores et al. |
| 6,206,785 B1 | | 3/2001 | Thomas |
| 6,390,925 B1 | | 5/2002 | Perrow |
| 6,443,844 B1 | | 9/2002 | Perrow |
| 6,468,164 B2 | | 10/2002 | Song |
| 6,533,668 B2 | | 3/2003 | Mizukoshi et al. |
| 6,582,313 B2 | | 6/2003 | Perrow |
| 6,616,537 B2 | | 9/2003 | Thomas et al. |
| 6,616,538 B2 | | 9/2003 | Perrow |

FOREIGN PATENT DOCUMENTS

| | | | | |
|---|---|---|---|---|
| FR | 773714 | | 11/1934 | |
| JP | 62-17426 | * | 1/1986 | ................. 464/906 |

* cited by examiner

Primary Examiner—Greg Binda
(74) Attorney, Agent, or Firm—Michael D. Smith

(57) ABSTRACT

A constant velocity joint assembly comprises outer and inner joint members having engaging contact surfaces which support the joint for articulation about a common center point. The joint members have ball grooves which diverge inwardly of the joint and whose inner and outer ball groove surfaces are axially offset with respect to the center point for urging the balls axially inwardly. A ball retainer is provided within the outer joint member. The ball retainer is spring-biased into engagement with an end of the inner joint member and pivots about the center point of the joint to engage and hold the balls within the ball grooves, maintaining them in a common plane.

15 Claims, 2 Drawing Sheets

CONSTANT VELOCITY JOINT

BACKGROUND OF THE INVENTION

1. Technical Field

This invention relates to constant velocity universal joints.

2. Related Art

Constant velocity joints are used to transmit torque through an angle while maintaining constant velocity ratio between a driving and driven shaft member of the joint at all angles. A typical constant velocity joint includes an outer joint member formed with a part-spherical inner surface and a series of ball grooves, an inner joint member formed with a part-spherical outer surface and a series of complimenting ball grooves aligned with the grooves of the outer joint member, a plurality of torque-transmitting balls received in the aligned grooves, and a ball cage disposed between the inner and outer joint members and having part-spherical surfaces in contact with those of the inner and outer joint members for articulation of the joint and capture of the balls within the grooves.

The package size of a constant velocity joint is dependent in part on the angle to be achieved in the stack-up dimensions of the component parts, namely the inner joint part, the outer joint part and the intervening ball cage. Reducing the thickness of any one or more of these components may impair the strength or integrity of the joint, and thus there is a limit as to how small the conventional constant velocity joint can be made without detracting from its strength or reducing its degree of articulation.

U.S. Pat. Nos. 5,201,107 and 5,230,659 disclose constant velocity joints in which the conventional cage has been eliminated and the balls held in the grooves by a retainer within the outer joint member. Both joints are of rather complex construction, requiring special machining and component parts as well as special installation techniques to assemble the parts. The ball retainer of U.S. Pat. No. 5,201,107 is pivotally supported by the outer joint member along a line of curvature corresponding to that of the contact surfaces between the inner and outer joint members, which lends to a rather large package size in both the radial and axial directions.

It is an object of the present invention to provide a simple, efficient, compact constant velocity joint.

SUMMARY OF THE INVENTION AND ADVANTAGES

A constant velocity joint assembly constructed according to the invention comprises an outer joint member and an inner joint member disposed at least partially within the outer joint member. The outer and inner joint members have abutting contact surfaces supporting the joint members for relative pivotal movement about a fixed center point of the joint members. The outer and inner joint members have a plurality of circumferentially spaced ball grooves formed in the contact surfaces and diverging toward one end of the outer joint member. A plurality of torque-transmitting balls are disposed in the ball grooves. A ball retainer is disposed within the outer joint member and has an inner seat portion and a ball-engaging portion engaging the balls. The inner joint member has an end portion engaging the inner seat portion of the ball retainer and supporting the ball retainer for relative pivotal movement about a pivot point common with the fixed center point of the outer and inner joint members.

The invention has the advantage of simplifying the construction and assembly of fixed-center constant velocity joints. The ball retainer is constructed and supported in such manner as to provide an overall compact constant velocity joint in length and in diameter compare to known prior art constant velocity joints with and without the usual ball cage.

The invention has the further advantage of providing an inner joint member which is solid throughout in the vicinity of the center of the joint and which directly supports the ball retainer during pivotal movement, providing strength and integrity to the joint under load.

THE DRAWINGS

These and other features and advantages of the present invention will become more readily appreciated when considered in connection with the following detailed description and appended drawings, wherein.

DETAILED DESCRIPTION

Figure 1:
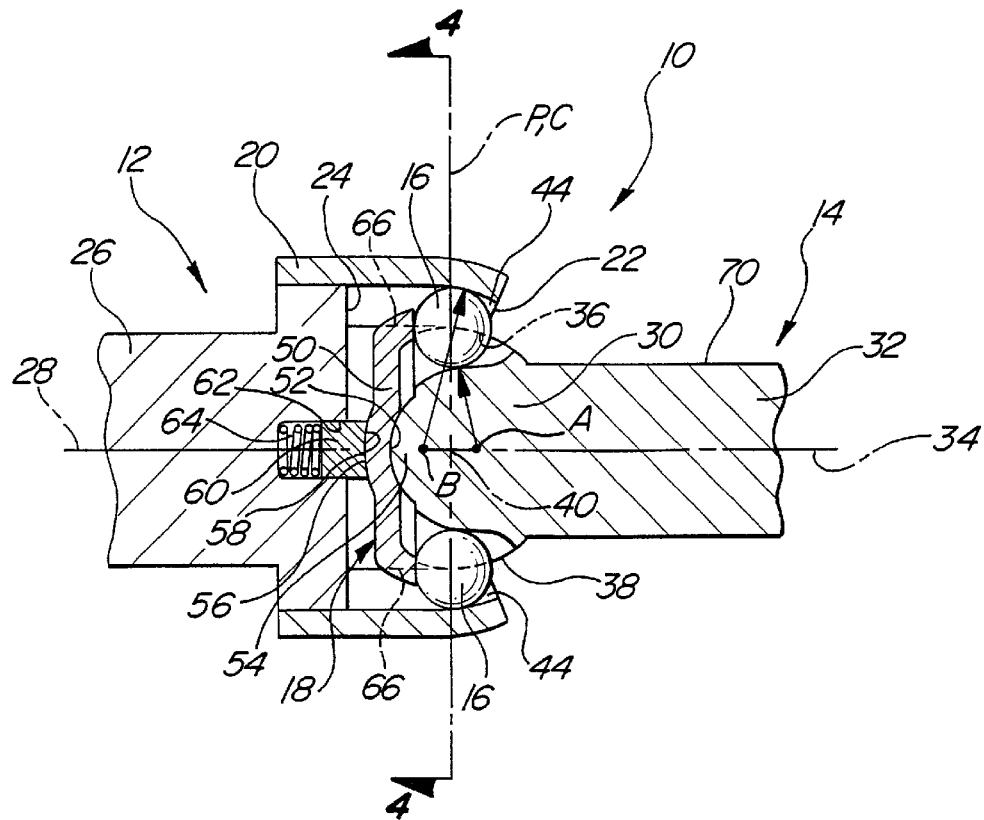
FIG. 1 is a fragmentary sectional view of a joint assembly constructed according to a presently preferred embodiment of the invention.
Figure 2:
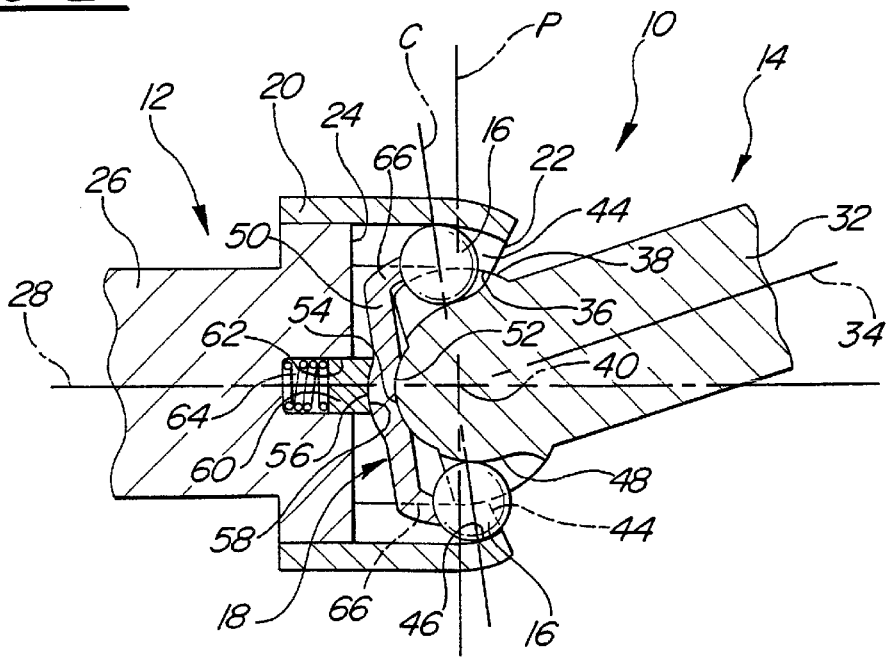
FIG. 2 is a view like FIG. 1 but showing the joint at an angle.
Figure 3:
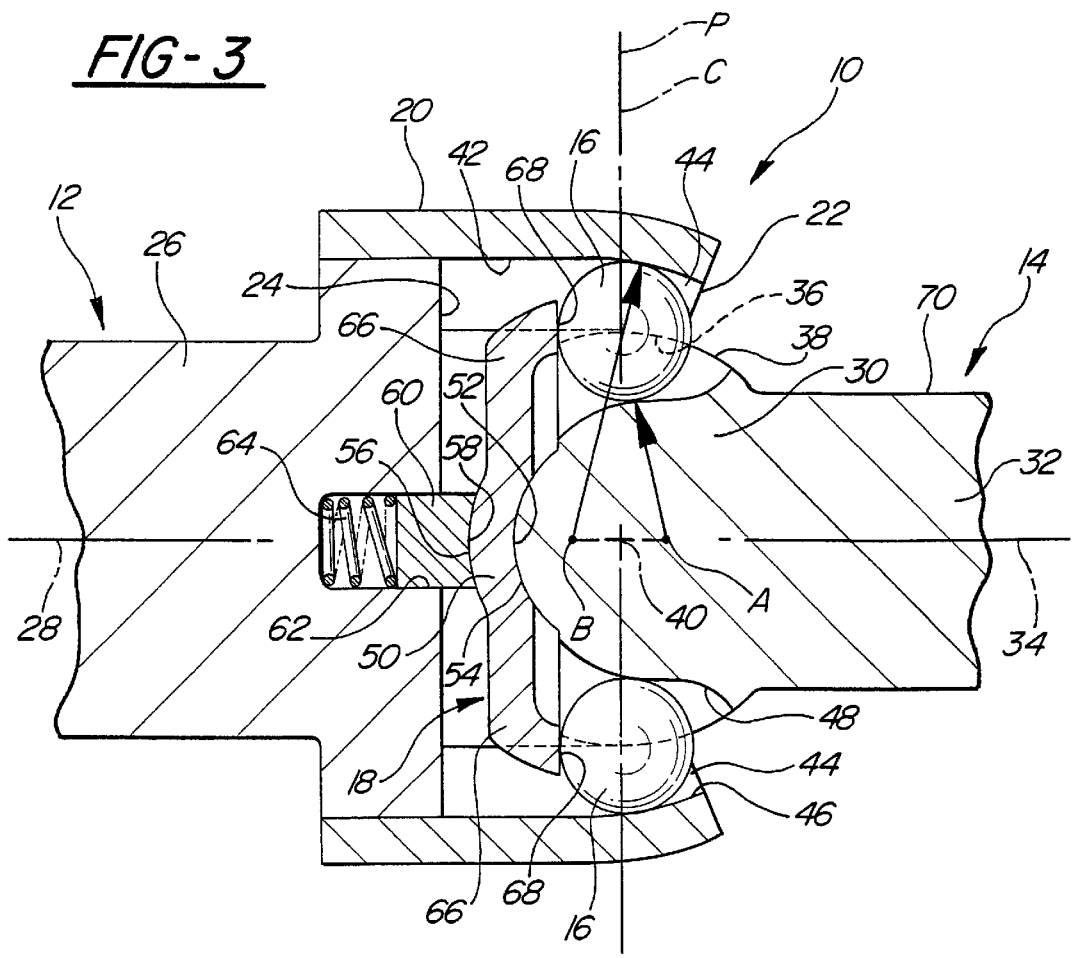
FIG. 3 is an enlarged fragmentary sectional view of the joint of FIG. 1.

A constant velocity joint assembly constructed according to a presently preferred embodiment of the invention is shown generally at 10 in FIGS. 1 and 2 and comprises an outer joint member 12, an inner joint member 14, a plurality of torque-transmitting balls 16 and a ball retainer 18.

The outer joint member 12 comprises an outer joint housing 20 that is generally cup-shaped having an open end 22 and an axially opposite closed end 24. A shaft 26 extends from the closed end 24 along an axis 28 of the outer joint member 12. The housing may comprise a separate structure from the shaft 26 joined thereto such as by welding, bolting, screw threads, pinning, etc. to facilitate installation of the inner joint member 14 within the outer joint member 12.

The inner joint member 14 is disposed at least partially within the outer joint member 12. The inner joint member 14 comprises an enlarged joint head or joint portion 30 carried at one end of a shaft 32 of the inner joint member 14 extending along an axis 34 of the inner joint member 14. The joint head 30 is received within the outer joint housing 20. The outer joint housing 20 and joint head 30 present mutual contact surfaces 36,38 which are configured to directly engage one another and to support the outer and inner joint members 12,14 for articulated or pivotal movement about a fixed center point 40 of the joint assembly 10, enabling the joint members 12,14 to pivot in all directions about the center point 40. The contact surfaces 36,38 are preferably, but not necessarily, part-spherical. As best shown in FIGS. 1 and 2, the contact surface 36 of the outer joint member 12 is part-spherical adjacent the open end 22 and transitions into a linear section 42 parallel to the axis 28 of the outer joint member 12 adjacent the closed end 24 at a point in a plane P perpendicular to the axis 28 and passing through the joint center 40.

The contact surface 38 on the inner joint member 14 is preferably part-spherical and slightly smaller in diameter than the diameter of the linear section 42. The contact surface 36 adjacent the open end 22 terminates at the open end 22 in a diameter slightly smaller than the diameter of the contact surface 38 so as to secure the inner joint member 14 against removal from the outer joint member 12 axially away from the closed end 24.

The outer and inner joint members 12,14 are formed with a plurality of circumferentially spaced ball grooves 44 which extend into the contact surfaces 36,38 and diverge toward the closed end 24 of the outer joint member 12. The ball grooves 44 are each formed by opposing ball groove surfaces formed in the outer and inner joint members 12,14. As best shown in FIG. 1, the ball groove surface 46 of the outer joint member 12 has a center of curvature B which is offset axially from the center point 40 of the joint assembly 10 by a fixed axial distance along the axis 28. The ball groove surface 48 of the inner joint member 14 is spaced radially inwardly from the outer ball groove surface 46 and has a center of curvature A spaced axially from the center point 40 by a distance equal to the spacing of the center point B but on the axially opposite side of the center point 40 along the axis 34. This offset relationship of the inner and outer ball groove centers in relation to the center point 40 and inward divergent relationship of the ball groove surfaces 46,48 tends to push the balls 16 toward the closed end 24 of the outer joint member 12. The balls 16 are held in place in the ball grooves 44 by the ball retainer 18, supporting the balls 16 in a common ball plane C which passes through the center point 40 at all joint angles, as illustrated in FIGS. 1 and 2.

The ball retainer 18 includes a central body portion 50 having an inner seat portion 52 engaging an end portion 54 of the inner joint member 14 for supporting the ball retainer 18 for pivotal movement relative to the outer and inner joint members 12,14 about a pivot point common with the center point 40 of the joint assembly 10. The inner seat portion 52 is concave in curvature and has a center of curvature at the center point 40. The end portion 54 is preferably in the form of a part-spherical protrusion extending axially beyond the ball groove surfaces 48 and has a center of curvature at the center point 40. As best shown in FIGS. 1 and 2, the inner joint member 14 is solid in section at the center point 40 and through to the end portion 54 for strength and durability. The inner seat portion 52 is spaced closer to the fixed center point 40 than are the contact surfaces 36, 38 of the outer and inner joint members 12, 14, respectively.

The central body 50 of the ball retainer 18 has an outer convex surface 56 having a center of curvature at the center point 40, but spaced further from the center point 40 than that of the inner seat portion 52 while still being spaced closer to the center point 40 than are the contact surfaces 36, 38 of the outer 12 and inner 14 point members. The outer convex surface 56 engages a concave retainer seat 58 supported by the outer joint member 12. The concave retainer seat 58 preferably comprises a part-spherical recess in the ball retainer 18 having a center of curvature in common with the center point 40 of the joint 10. The concave retainer seat 58 is movable axially relative to the outer joint member 12 along the axis 28. The concave retainer seat 58 is formed on the end of a plunger 60 which is received in an axial bore 62 of the outer joint member 12 along the axis 28. A spring 64 is disposed in the bore 62 and acts on the plunger 60 to urge the plunger 60 constantly toward the center point 40 along the axis 28. Such constant force acts to bias the concave retainer seat 58 constantly against the outer convex surface 56 of the ball retainer 18, and further to bias the inner seat portion 52 constantly against the end portion 54 of the inner joint member 14 at all joint angles.

The ball retainer 18 includes a plurality of fingers extending radially outwardly of the central body portion 50 and aligned radially with the ball grooves 44. The number of fingers 66 corresponds to the number of ball grooves 44. The fingers 66 extend upwardly into each ball groove 44 and terminate at ends 68 which contact the balls 16. The fingers 66 are constantly biased axially toward the open end 22 of the outer joint member 12, and thus constantly urge the balls 16 axially toward the open end 22, thereby holding the balls 16 within their respective ball grooves 44 through all angles of the joint. The fingers 66 are formed as one piece with the central body 50 and are elastically resilient to maintain the constant bias force on the balls 16. The central body 50 and fingers 66 may be formed of metal or plastics material, such as a metal stamping, having a plurality of radial spring arms serving as the fingers 66. The plunger 60 may likewise be fabricated of metal or plastics material.

The shaft 32 of the inner joint member 14 has an outer diameter surface adjacent an enlarged joint portion of the inner joint member 14 in which the ball groove surfaces 48 are formed. The ball groove surfaces 48 extend inwardly of the enlarged joint portion 30 beyond the outer diameter surface of the shaft 32.

No portion of the ball retainer 18 extends beyond the center point 40 axially outwardly of the outer joint member 12.

Figure 4:
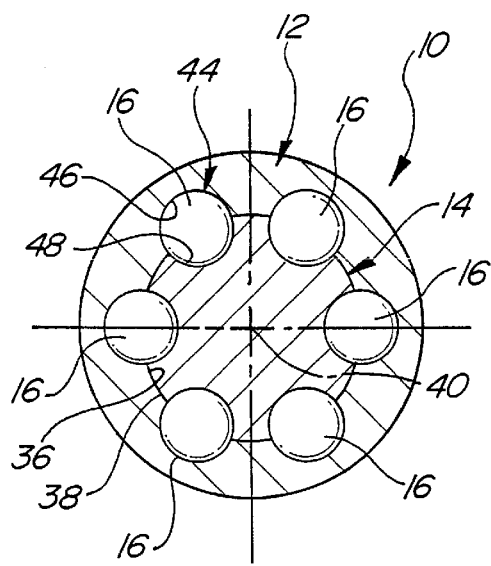
FIG. 4 is a cross-sectional view taken generally along lines 4—4 of FIG. 1.
Figure 5:
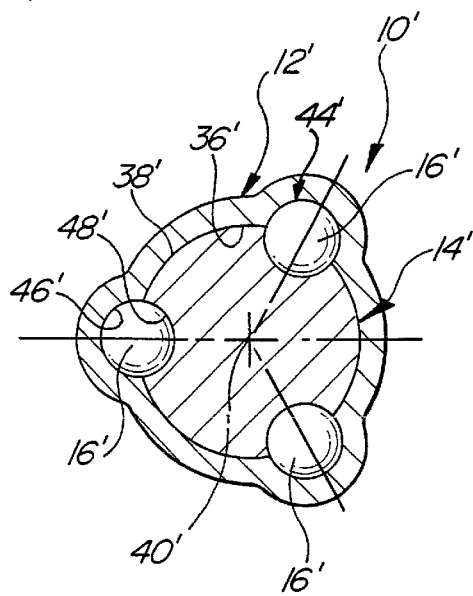
FIG. 5 is a view like FIG. 4 but of an alternative joint construction.

FIG. 4 is a cross-sectional view of the joint of FIGS. 1 and 2 taken along the ball center plane C. It will be seen that there are an even number of balls, namely six shown. FIG. 5 shows an alternative embodiment of the joint assembly in which there are an odd number of balls 16 and ball grooves 44', namely three shown. The same reference numerals are used in FIG. 5 to designate like features, but are primed. The invention thus contemplates odd and even numbers of balls of any multiple, with a minimum of three balls being required, and the maximum being determined by the space available and the required strength of the joint. A range of 3–8 balls is preferred.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A constant velocity joint assembly comprising:

an outer joint member;

an inner joint member disposed at least partially within said outer joint member;

said outer and inner joint members having abutting contact surfaces supporting said inner and outer joint members for relative pivotal movement about a fixed center point of said inner and outer joint members;

said outer and inner joint members having a plurality of circumferentially spaced ball grooves formed in said contact surfaces and diverging toward one end of said outer joint member;

a plurality of torque-transmitting balls disposed in said ball grooves; and a ball retainer disposed within said outer joint member having an inner seat portion and a ball-engaging portion, said ball-engaging portion engaging said balls, said inner joint member having an end portion engaging said inner seat portion of said ball retainer and supporting said ball retainer for relative pivotal movement about a pivot point common with said fixed center point of said outer and inner joint members, and wherein said inner seat portion is spring-biased toward said end portion of said inner joint member.

2. The assembly of claim 1 wherein said inner seat portion and said ball engaging portion are fabricated of a single piece of material.

3. The assembly of claim 1 wherein said inner seat portion is spaced closer to said fixed center point than are said contact surfaces of said outer and inner joint members.

4. The assembly of claim 1 wherein said inner seat portion comprises a part-spherical recess in said ball retainer.

5. The assembly of claim 4 wherein said end portion of said inner joint member has a part-spherical shape.

6. The assembly of claim 1 wherein said ball retainer includes an outer convex surface having a center of curvature coincident with said fixed center point of said outer and inner joint members.

7. The assembly of claim 6 wherein said outer convex surface is spaced closer to said fixed center point than said contact surfaces of said outer and inner joint members.

8. The assembly of claim 7 including a concave retainer seat supported by said outer joint member and engaging said outer convex surface of said ball retainer.

9. The assembly of claim 8 wherein said concave retainer seat has a center of curvature common with said fixed center point.

10. The assembly of claim 8 wherein said concave retainer seat is movable axially relative to said outer joint member.

11. The assembly of claim 10 including a spring biasing said concave retainer seat axially away from said outer joint member.

12. The assembly of claim 11 wherein said outer joint member includes an axial bore, a spring disposed in said bore, a plunger disposed in said bore having said concave retainer seat at an outer free end thereof and biased by said spring toward said outer convex surface of said ball retainer.

13. The assembly of claim 1 wherein said ball retainer includes a central body formed with said inner seat portion and said ball engaging portion comprises a plurality of fingers extending from said central body portion into said ball grooves of said outer and inner joint members.

14. The assembly of claim 1 wherein said inner joint member includes a shaft and an enlarged joint portion on an end of said shaft formed with a portion of said ball grooves extending radially inwardly of an outer diameter surface of said shaft adjacent said enlarged joint portion.

15. The assembly of claim 1 wherein said end portion of said inner joint member projects axially beyond said ball grooves of said inner joint member.

* * * * *